(12) United States Patent
Kim et al.

(10) Patent No.: US 11,851,023 B2
(45) Date of Patent: Dec. 26, 2023

(54) PRE-TENSIONER FOR SEAT BELT

(71) Applicants: Hyundai Motor Company, Seoul (KR); Kia Corporation, Seoul (KR); Samsong Industries, Ltd., Seoul (KR)

(72) Inventors: Dae Woon Kim, Gyeonggi-do (KR); Jung Woo Park, Gyeongsangnam-do (KR); Won Ryong Song, Gyeongsangnam-do (KR)

(73) Assignees: Hyundai Motor Company, Seoul (KR); Kia Corporation, Seoul (KR); Samsong Industries, Ltd., Seoul (KR)

( * ) Notice: Subject to any disclaimer, the term of this patent is extended or adjusted under 35 U.S.C. 154(b) by 0 days.

(21) Appl. No.: 17/897,875

(22) Filed: Aug. 29, 2022

(65) Prior Publication Data

US 2023/0097938 A1     Mar. 30, 2023

(30) Foreign Application Priority Data

Sep. 24, 2021   (KR) ........................ 10-2021-0126425

(51) Int. Cl.
*B60R 22/20* (2006.01)
*B60R 22/26* (2006.01)

(52) U.S. Cl.
CPC ............ *B60R 22/201* (2013.01); *B60R 22/26* (2013.01)

(58) Field of Classification Search
CPC ... B60R 22/201; B60R 22/202; B60R 22/203; B60R 22/1958; B60R 22/26; B60R 22/1952; B60R 2022/207
See application file for complete search history.

(56) References Cited

U.S. PATENT DOCUMENTS

| | | | |
|---|---|---|---|
| 5,358,310 A * | 10/1994 | Nemoto | B60R 22/201 297/483 |
| 6,769,716 B2 | 8/2004 | Rouhana et al. | |
| 7,350,734 B2 * | 4/2008 | Stevens | B60R 22/1955 297/480 |
| 7,976,066 B2 * | 7/2011 | Bok | B60R 22/1952 297/480 |
| 8,550,499 B2 | 10/2013 | Russell et al. | |
| 11,584,332 B2 * | 2/2023 | Sugamata | B60R 22/20 |
| 2001/0037907 A1 * | 11/2001 | Peter | B60R 22/343 180/268 |
| 2005/0151365 A1 * | 7/2005 | Nakayama | B60R 22/1952 280/806 |

FOREIGN PATENT DOCUMENTS

| | | | | |
|---|---|---|---|---|
| GB | 2367039 A * | 3/2002 | | B60R 22/022 |
| KR | 10-2011-0025532 A | 3/2011 | | |

(Continued)

*Primary Examiner* — Paul N Dickson
*Assistant Examiner* — Matthew D Lee
(74) *Attorney, Agent, or Firm* — Fox Rothschild LLP

(57) ABSTRACT

Provided is a pre-tensioner for a seat belt, the pre-tensioner including a housing, a carrier disposed on a first surface of the housing, a fixing member connected to the carrier, a first pulley disposed in a first zone of the first surface of the housing, a second pulley disposed in a second zone of the first surface opposite to the first zone with respect to the carrier, a driving unit having at least a portion coupled to the second pulley, and a belt disposed to mesh with the first pulley, the second pulley, and the carrier.

20 Claims, 12 Drawing Sheets

(56) References Cited

FOREIGN PATENT DOCUMENTS

| KR | 10-1199715 B1 | 11/2012 | | |
|---|---|---|---|---|
| KR | 10-1331448 B1 | 11/2013 | | |
| KR | 10-1356180 B1 | 1/2014 | | |
| KR | 10-1674496 B1 | 11/2016 | | |
| WO | WO-2014146783 A1 * | 9/2014 | ............. | B60R 22/03 |

* cited by examiner

PRE-TENSIONER FOR SEAT BELT

CROSS REFERENCE TO RELATED APPLICATION

The present application is based on and claims under 35 U.S.C. § 119(a) the benefit of Korean Patent Application No. 10-2021-0126425, filed Sep. 24, 2021, the entire contents of which is incorporated herein for all purposes by this reference.

TECHNICAL FIELD

Embodiments of the present disclosure relate to a pre-tensioner disposed in an area of a vehicle seat and configured to prevent a submarine effect due to a reduction of an intersection angle during a vehicle collision.

DESCRIPTION OF THE RELATED ART

In general, a seat belt is provided in a vehicle to prevent injury to a passenger in an event of a collision with an external object. The seat belt may perform a function of protecting a passenger from a collision by partially restraining a passenger's body when the vehicle collides with an external object.

The seat belt may be used alone to prevent injury to the passenger, but depending on the degree of body restraint of the seat belt, a situation in which the passenger may not be safely protected may occur. For example, when the seat belt excessively restrains the passenger's body or restrains the passenger's body in an excessively loose state, a problem may occur in that the function according to the original purpose may not be properly performed.

Meanwhile, in order to prevent the above-described problem, a pre-tensioner may be further disposed in the vehicle in addition to the seat belt. For example, the pre-tensioner may further secure the seat belt to the passenger's body by clamping or momentarily retracting a portion of the seat belt in the event of a vehicle crash. As a result, it is possible to minimize the degree of injury or the possibility of injury to passengers that may occur inside the vehicle.

SUMMARY

Accordingly, embodiments of the present disclosure have been made keeping in mind the above problems occurring in the related art, and embodiments provide a pre-tensioner for a seat belt configured to move an anchor to a most appropriate position to protect the passenger from injury in the event of a vehicle collision, thereby efficiently minimizing a submarine effect.

In addition, the embodiments provide the pre-tensioner capable of more safely protecting a passenger in a crash situation through a structure to which other components (for example, buckles) related to the seat belt may be coupled as well as the anchor.

Problems to be solved through the embodiments are not limited to the above-mentioned problems, and problems not mentioned may be clearly understood by those of ordinary skill in the art to which the embodiments belong from the present specification and the accompanying drawings.

In order to achieve the above objective, there may be provided a pre-tensioner for a seat belt according to one embodiment of the present disclosure, the pre-tensioner being an autonomous moving device and including: a housing; a carrier disposed on a first surface of the housing; a fixing member connected to the carrier; a first pulley disposed in a first zone of the first surface of the housing; a second pulley disposed in a second zone of the first surface opposite to the first zone with respect to the carrier; a driving unit having at least a portion coupled to the second pulley; and a belt disposed to mesh with the first pulley, the second pulley, and the carrier.

In some embodiments, the pre-tensioner may further include: a wire coupled to the housing; and an anchor or a buckle coupled to another end opposite to one end of the wire fastened to the housing.

In some embodiments, the fixing member may be configured to rotate in the same direction as a rotation direction of the carrier when the carrier rotates on the basis of an impact on the pre-tensioner.

In some embodiments, the fixing member may further include a protrusion part coupled to an opening part formed in at least a portion of the housing.

In some embodiments, the fixing member may be connected to the carrier by using a torsion spring, a return spring, or a combination thereof.

In some embodiments, the pre-tensioner may further include: at least one coupling member disposed on a second surface of the housing facing a direction opposite to the first surface of the housing, wherein the at least one coupling member is disposed in a zone adjacent to the first zone in which the first pulley is disposed.

In some embodiments, the pre-tensioner may further include: at least one hook disposed on a second surface of the housing facing a direction opposite to the first surface of the housing.

In some embodiments, the pre-tensioner may further include: at least one bolt disposed on a second surface of the housing facing a direction opposite to the first surface of the housing, wherein the at least one bolt may be disposed in a zone adjacent to the second zone in which the second pulley is disposed.

In some embodiments, the driving unit may include a motor, a worm gear, a helical gear, a spur gear, or a combination thereof.

In some embodiments, the motor may comprise a power unit.

In some embodiments, the belt may be a timing belt.

In some embodiments, the belt may be mounted inside the housing.

In some embodiments, the belt may be moved or rotated by the driving unit.

In some embodiments, the belt may be mounted on a rail.

In some embodiments, the belt may be physically coupled to the carrier.

In some embodiments, the belt may be physically coupled to an upper portion and a lower portion of the carrier.

In some embodiments, a seat comprising a coupling part configured to couple with the pre-tensioner may be provided.

In some embodiments, a vehicle comprising the seat may be provided.

As described above, embodiments can effectively protect passengers from dangerous situations by adaptively changing positions of various components (for example, anchors or buckles) coupled to the seat belt when a vehicle crash situation occurs.

In addition, the embodiments can effectively prevent a submarine effect such as trapping of the abdomen by webbing by operating the pre-tensioner at an optimal position.

The effects of the embodiments are not limited to the above-described effects, and the effects not mentioned will be clearly understood by those of ordinary skill in the art to which the embodiments belong from the present specification and the accompanying drawings.

As discussed, the system suitably includes use of a controller or processer.

In another embodiment, vehicles are provided that comprise a pre-tensioner for seat belt as disclosed herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
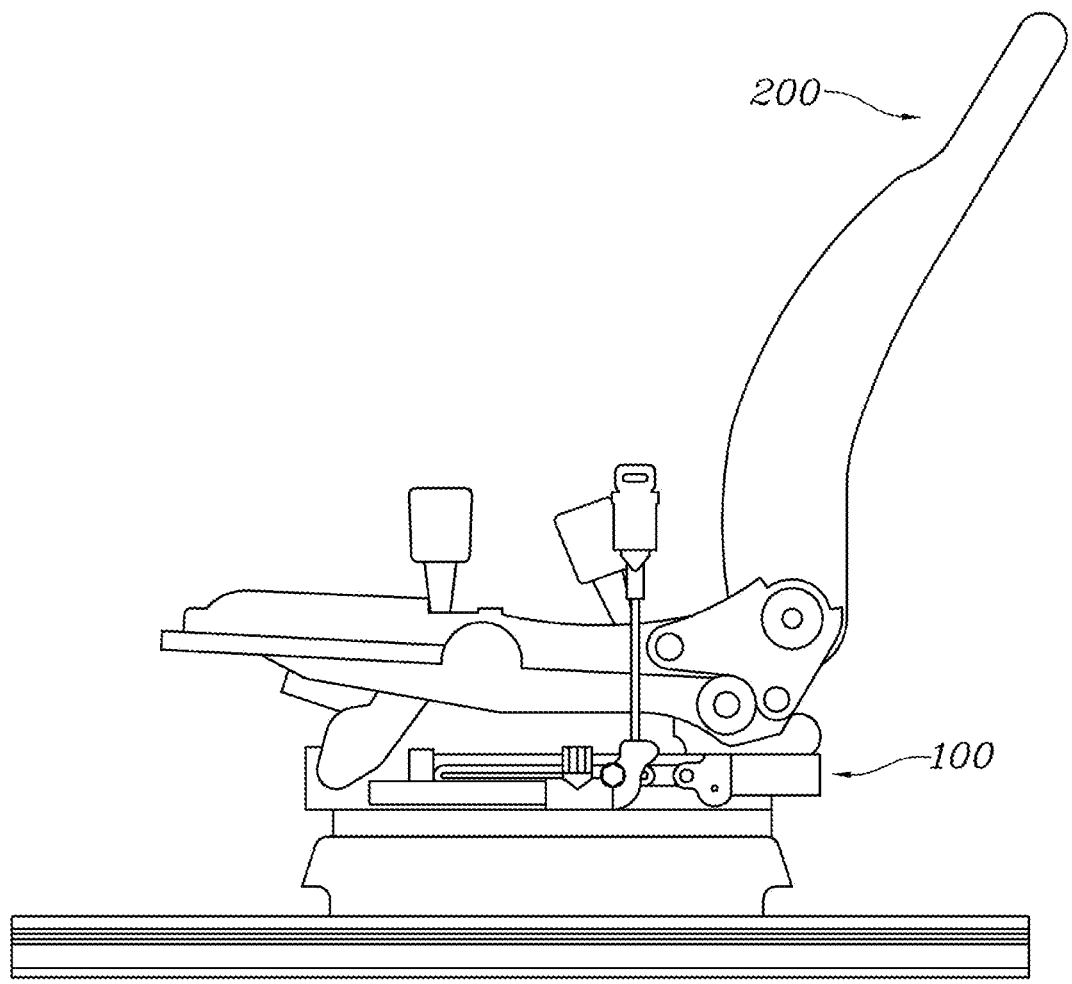
FIG. 1 is a view illustrating an appearance in which a pre-tensioner of an exemplary embodiment is mounted on a seat.

Terms used in embodiments are selected as currently widely used general terms as possible while considering functions in the present disclosure but may vary according to intentions of those of ordinary skill in the art, precedents, emergence of new technologies, or the like. In addition, in specific cases, there are also terms arbitrarily selected by the applicant, and in this case, the meaning will be described in detail in corresponding description parts of the present disclosure. Therefore, the terms used in the present disclosure should be defined on the basis of the meaning of the terms and the overall content of the present disclosure, rather than simple names of the terms.

When a part "includes" a component throughout the specification, this means that other components may be further included, rather than excluding other components, unless otherwise stated. In addition, terms such as "-unit" and "-module" described in the specification mean a unit that processes at least one function or operation, which may be implemented as hardware or software, or a combination of hardware and software.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Hereinafter, with reference to the accompanying drawings, the embodiments will be described in detail so that those of ordinary skill in the art may easily carry out the embodiments. However, the embodiments may be implemented in several different forms and are not limited to the embodiments described herein.

Hereinafter, the embodiments will be described in detail with reference to the drawings. In the present specification, the pre-tensioner 100 refers to a device that further restrains a body of a user or an occupant by momentarily pulling a seat belt by itself without manipulation of the user or the occupant when a specified condition is satisfied. For example, the pre-tensioner 100 according to the embodiments may be coupled or mounted to at least one area of a seat 200 disposed in a vehicle.

FIG. 1 is a view illustrating an appearance in which a pre-tensioner of an exemplary embodiment is mounted on a seat.

With reference to FIG. 1, the pre-tensioner 100 according to the embodiment may be coupled to at least a portion of the seat 200.

The pre-tensioner 100 may be coupled to at least a portion of the seat 200. For example, the pre-tensioner 100 may be disposed inside the vehicle and coupled to a side of a seat frame configured to allow a passenger to sit. For example, the pre-tensioner 100 may be configured such that the components (for example, an anchor or a buckle) associated with the seat belt are coupled thereto through wires. For another example, the pre-tensioner 100 may also be configured such that components associated with the seat belt are coupled thereto without wires. In addition, the pre-tensioner 100 may include housing, a carrier disposed on a first surface of the housing, a fixing member (for example, a lock plate) connected to the carrier, at least one pulley disposed on the first side of the housing, a driving unit physically coupled to the at least one pulley, and a belt disposed to mesh with at the least one pulley and the carrier. A description of the components of the pre-tensioner 100 may be referred to in more detail in the description of FIG. 2 to be described later.

The seat 200 may include a coupling part configured to couple with the pre-tensioner 100. For example, the seat 200 may include the seat frame in which the coupling parts (for example, nuts) configured to fasten with bolts included in the pre-tensioner 100 are formed. For another example, the seat 200 may include the seat frame in which coupling parts (for example, holes) configured to fasten with coupling members (for example, hooks) included in the pre-tensioner 100 are formed.

The pre-tensioner 100 may operate when a specified condition is satisfied. For example, when an impact applied to the pre-tensioner 100 from the outside exceeds a specified strength, the pre-tensioner 100 may momentarily retract the wire connected to the anchor or the buckle.

The components related to the present embodiments are illustrated in the pre-tensioner 100 and the seat 200 illustrated in FIG. 1. Therefore, it may be understood by those of ordinary skill in the art related to the present embodiment that other general-purpose components in addition to the components illustrated in FIG. 1 may be further included in the pre-tensioner 100 and the seat 200.

Figure 2:
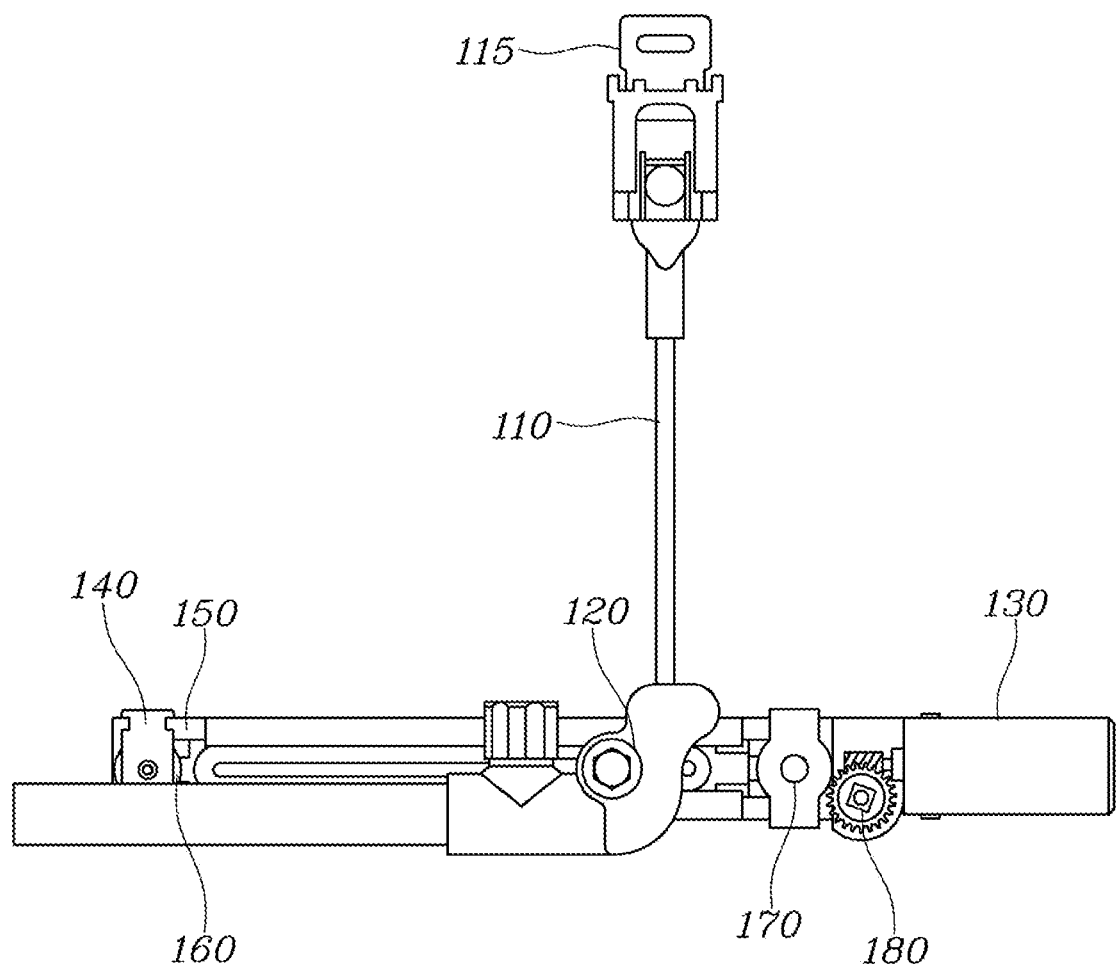
FIG. 2 is a view illustrating components of the pre-tensioner of the embodiment.

FIG. 2 is a view illustrating components of the pre-tensioner of the embodiment.

The pre-tensioner 100 may include a wire 110, an anchor 115, a carrier 120, a motor 130, a housing 140, a belt 150, a first pulley 160, a second pulley 170, and/or a first gear 180.

The wire 110 may be coupled to the housing 140. For example, one end of the wire 110 may be coupled to one area of the housing 140, and another end opposite to the one end may be coupled to various components (for example, the anchor 115 or buckle) associated with the seat belt. For example, the wire 110 may be exposed up to a sitting area of the seat.

The anchor 115 may be coupled to the wire 110. For example, the anchor 115 may be coupled to an opposite end of the wire 110. The anchor 115 may include at least one hole. For example, the anchor 115 may be configured to perform a function of allowing the seat belt to be passed therethrough and, in a specified situation, allowing one area of the passed seat belt to be fixed. For example, the specified situation may be referred to as a situation in which the vehicle collides with an external object.

The carrier 120 may be disposed on a first surface of the housing 140. For example, as shown in FIG. 1, the carrier 120 may be disposed on the first surface facing a direction opposite to a surface, of the housing 140, coupled to the seat. The carrier 120 may be connected to a fixing member (for example, a lock plate).

The motor 130 refers to a means configured to move at least one of the components included in the pre-tensioner 100. In other words, one component (for example, the first pulley 160, the second pulley 170, or the first gear 180) of the pre-tensioner 100 may move as the motor 130 operates. Although not shown in FIG. 2, the motor 130 may include devices such as a power unit that provides power to the components, a steering unit that adjusts a direction of an engine or a moving means, and a steering wheel.

The housing 140 may refer to a component constituting an exterior of the pre-tensioner 100. For example, the housing 140 may be defined as a frame in which components included in the pre-tensioner 100 are mounted or disposed. For example, a rail on which the belt 150 is mounted may be formed in the housing 140. For another example, the housing 140 may include various components (for example, bolts or hooks) to be coupled to an external object (for example, the seat frame). The wire 110 may be coupled to the one area of the housing 140. In other words, the one end of the wire 110 may be coupled to a portion of the housing 140.

The belt 150 may include various types of belts. For example, the belt 150 may include a timing belt (or cog belt). The belt 150 may be mounted inside the housing 140. The belt 150 may be arranged to mesh with various components included in the pre-tensioner 100. For example, the belt 150 may be disposed to mesh with the first pulley 160, the second pulley 170, and the carrier 120. Therefore, the belt 150 is moved or rotated by the driving of the motor 130, and thus the first pulley 160, the second pulley 170, and the carrier 120 may be moved or rotated in a regular direction.

The first pulley 160 and the second pulley 170 may be disposed on one surface of the housing 140. For example, the first pulley 160 may be disposed in a first zone of the first surface of the housing 140, and the second pulley 170 may be disposed in a second zone of the first surface of the housing 140. For example, the second zone may be a zone on the first surface opposite to the first zone with respect to the carrier 120. The first pulley 160 and the second pulley 170 may be disposed to mesh with the belt 150. For example, the second pulley 170 may be physically coupled to the motor 130 and the first gear 180. When the first gear 180 rotates by the driving of the motor 130, the second pulley 170 may rotate in a direction opposite to the direction in which the first gear 180 rotates.

The first gear 180 may include various types of gears. For example, the first gear 180 may include a worm gear, a helical gear, a spur gear, or a combination thereof. For example, the first gear 180 may rotate as the motor 130 operates. In FIG. 2, the first gear 180 and the motor 130 are illustrated as separate components, but embodiments of the present document are not limited thereto. For example, the motor 130 and at least the first gear 180 may be included to be collectively referred to as a driving unit.

The pre-tensioner 100 illustrated in FIG. 2 illustrates components related to the present embodiments. Therefore, it may be understood by those of ordinary skill in the art related to the present embodiment that other general-purpose components in addition to the components illustrated in FIG. 2 may be further included in the pre-tensioner 100.

Figure 3:
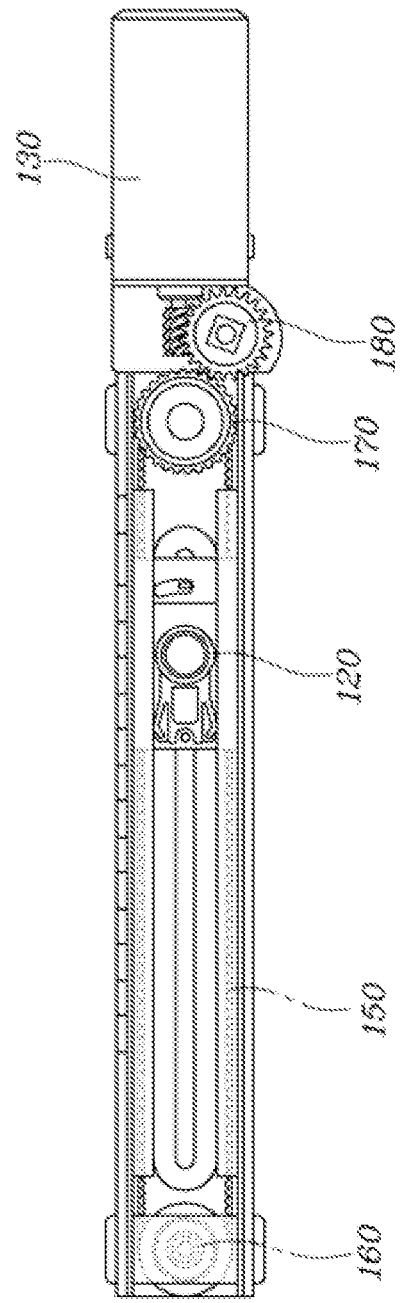
FIG. 3 is a view illustrating components of the pre-tensioner of the embodiment.

FIG. 3 is a view illustrating components of a pre-tensioner of the embodiment.

The pre-tensioner (for example, the pre-tensioner 100 of FIGS. 1 and 2) may include a carrier 120, a motor 130, a first pulley 160, a second pulley 170, a first gear 180, and a belt 150.

The carrier 120 may include various components. For example, the carrier 120 may include a fixing member (for example, a lock plate). The carrier 120 may be physically coupled to the belt 150. For example, when looking at FIG. 3, an upper portion and a lower portion of the carrier 120 may be physically coupled to the belt. The carrier 120 may move as the belt 150 moves. For example, when a situation in which a vehicle collides with an external object occurs, components (for example, a wire or a low anchor) coupled to an area adjacent to the carrier 120 may rotate or move. In response to the rotation or movement of the components, components (for example, fixing members) included in the carrier 120 may also rotate or move together.

The motor 130 may rotate the first gear 180. For example, the motor 130 may rotate at least one gear 180 using a power device. For example, when the first gear 180 rotates by the operation of the motor 130, the second pulley 170 disposed to mesh with the first gear 180 may rotate together.

The first pulley 160 may rotate together with the second pulley 170. For example, since the first pulley 160 is disposed to mesh with the belt 150, as the belt 150 moves by the rotation of the second pulley 170, the first pulley 160 may rotate together with the second pulley 170.

Figure 4:
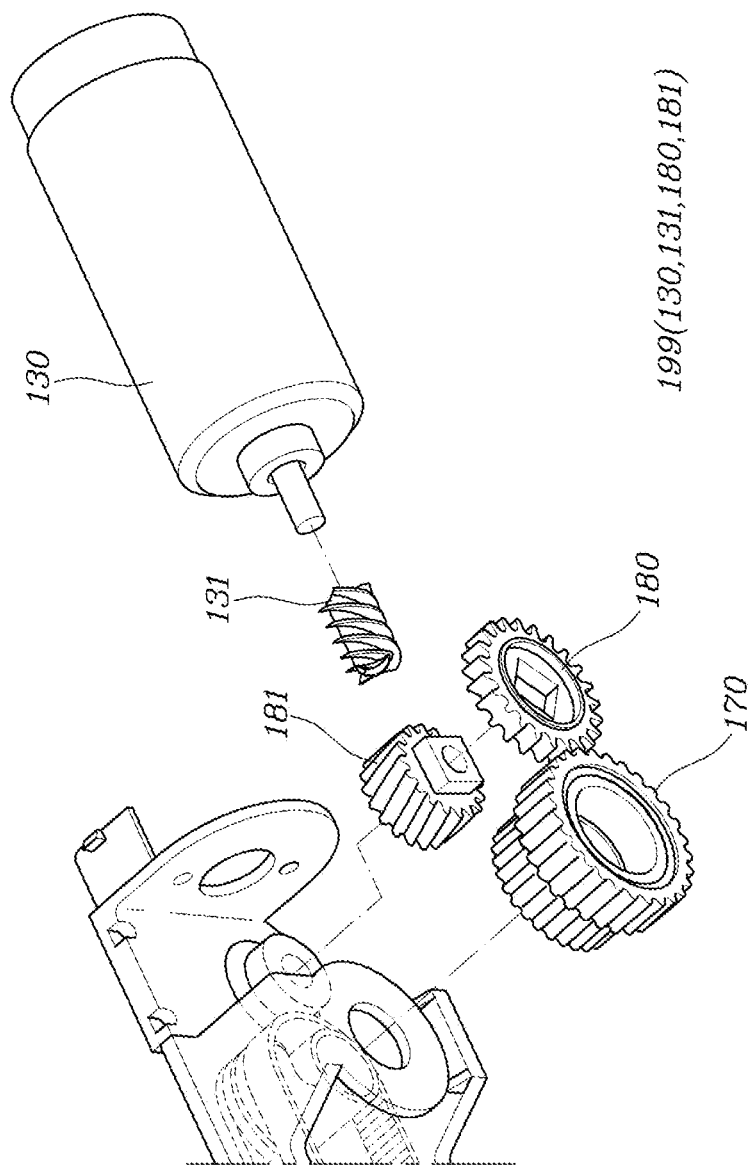
FIG. 4 is a view illustrating a fastening structure of a driving unit included in the pre-tensioner of the embodiment.

FIG. 4 is a view illustrating a fastening structure of a driving unit included in the pre-tensioner of the embodiment.

The pre-tensioner may include a driving unit 199. For example, the motor 130, a motor gear 131, the first gear 180, and a second gear 181 included in the pre-tensioner may be collectively referred to as the driving unit 199. The driving unit 199 may include the motor 130, the motor gear 131, the first gear 180, and the second gear 181. At least a portion of the driving unit 199 may be physically coupled to the second pulley 170. For example, the first gear 180 included in the driving unit 199 may be physically coupled to the second pulley 170.

The driving unit 199 may rotate the second pulley 170 by operating the power unit. For example, when the motor gear 131 rotates on the basis of the operation of the motor 130 included in the driving unit 199, the second gear 181 disposed to mesh with the motor gear 131 may rotate together. When the second gear 181 rotates, the first gear 180 disposed to mesh with the second gear 181 may rotate together. Since the first gear 180 is physically coupled to the second pulley 170, the second pulley 170 may rotate in a direction opposite to the direction in which the first gear 180 rotates.

The driving unit 199 illustrated in FIG. 4 illustrates the components related to the present embodiments. Therefore, it may be understood by those of ordinary skill in the art related to the present embodiment that other general-purpose components in addition to the components illustrated in FIG. 4 may be further included in the driving unit 199.

Figure 5:
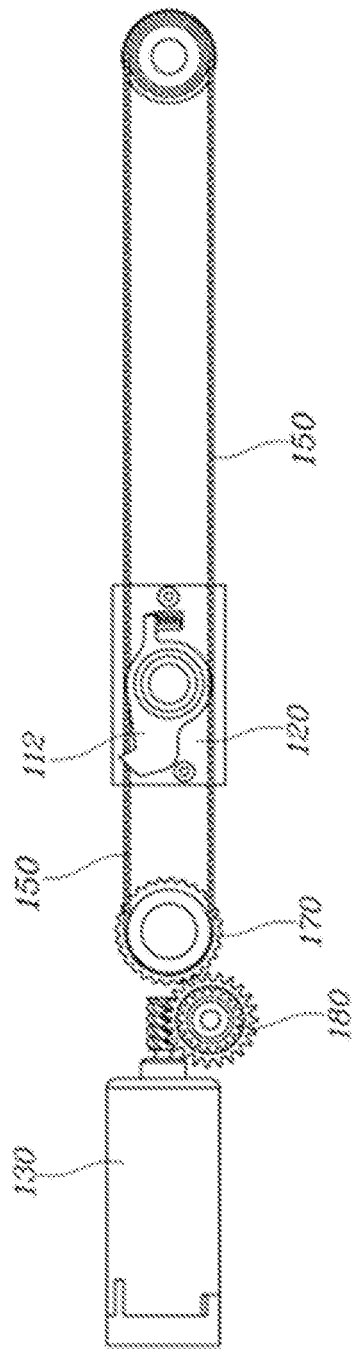
FIG. 5 is a view illustrating a carrier moving by driving of the driving unit of the embodiment.

FIG. 5 is a view illustrating a carrier moving by driving of the driving unit of the embodiment.

The pre-tensioner may include a carrier 120, a motor 130, a second pulley 170, a first gear 180, and a belt 150.

The carrier 120 may include a fixing member 112 coupled to at least a portion of one surface thereof. For example, the carrier 120 may include the fixing member 112 coupled to one surface thereof facing the same direction as the one surface to which the pre-tensioner is coupled to the seat frame. For example, since the carrier 120 is disposed to mesh with the belt 150, when the belt 150 moves on the basis of the operation of the motor 130, the carrier 120 may move together. For another example, the carrier 120 may rotate in a designated direction when an external impact is applied to the pre-tensioner. In this case, the fixing member 112 coupled to one surface of the carrier 120 may also rotate in the same direction as the designated direction.

The fixing member 112 may be defined as a lock plate. For example, the fixing member 112 may be connected to the carrier 120. For example, the fixing member 112 may be connected to the carrier 120 by using a torsion spring, a return spring, or a combination thereof. When the carrier 120 rotates on the basis of the impact on the pre-tensioner, the fixing member 112 may rotate in the same direction as the rotation direction of the carrier 120. The fixing member 112 may further include a protrusion part. For example, the fixing member 112 may include the protrusion part coupled to an opening part formed in at least a portion of the housing (for example, the housing 140 of FIG. 2) in a process of rotation. When the protrusion part included in the fixing member 112 is coupled to the opening part, a movement or rotation of the carrier 120 and the fixing member 112 may be stopped. Since the fixing member 112 is coupled to the carrier 120 by using the above-described type of spring, the protrusion part may be coupled to the opening part only when an impact exceeding the specified strength is applied.

Figure 6:
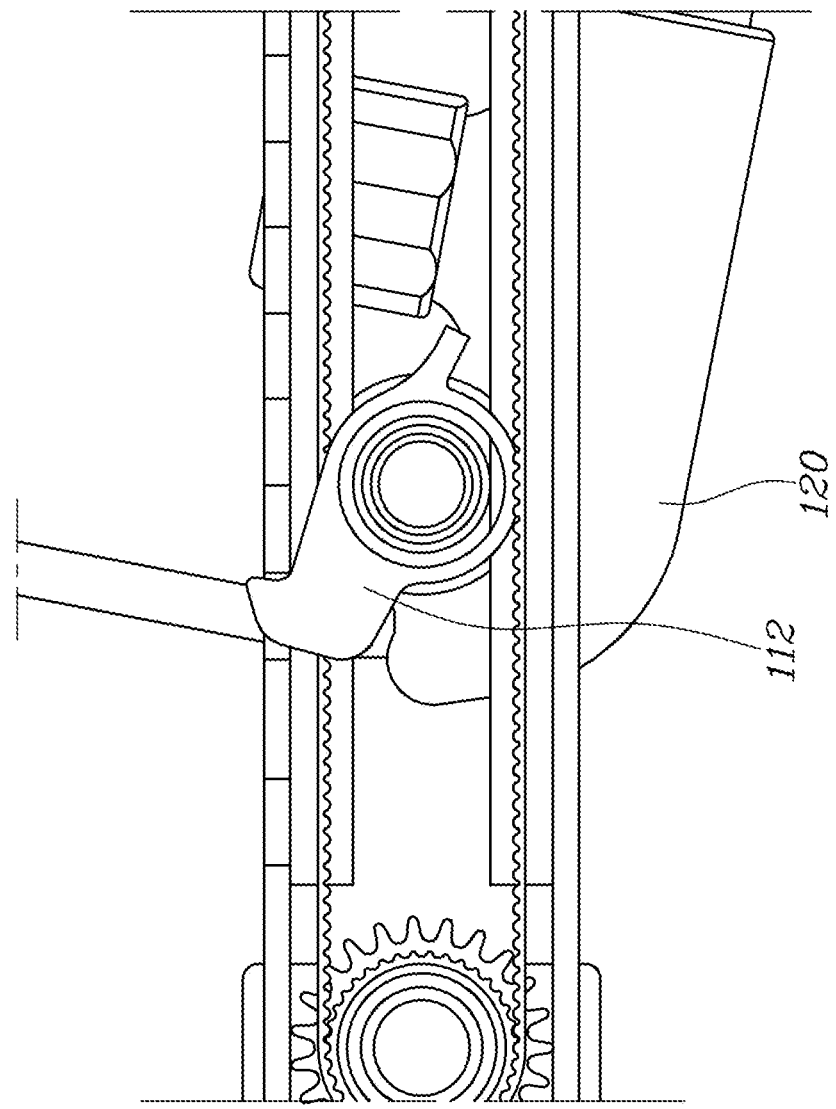
FIG. 6 is a view illustrating a state in which a fixing member connected to the carrier of the embodiment rotates.

FIG. 6 is a view illustrating a state in which a fixing member connected to the carrier of the embodiment rotates.

The fixing member 112 may be connected to the carrier 120. The fixing member 112 may be connected to the carrier 120 by using the torsion spring, the return spring, or the combination thereof.

The fixing member 112 may rotate together with the carrier 120 on the basis of the rotation of the carrier 120. For example, when a vehicle in which the pre-tensioner is mounted collides with an external object, an impact no less than a specified strength may be applied to the pre-tensioner. At this time, the carrier 120 included in the pre-tensioner may rotate. When the carrier 120 rotates, the fixing member 112 may rotate in the same direction as the rotation direction of the carrier 120. The carrier 120 and the fixing member 112 according to FIG. 6 may be referred to as being rotated in a clockwise direction when looking at FIG. 6.

The fixing member 112 may include a protrusion part. For example, as the fixing member 112 rotates, the protrusion part included in the fixing member 112 may be coupled to an opening part formed in at least a portion of the housing (for example, the housing 140 of FIG. 2).

Figure 7:
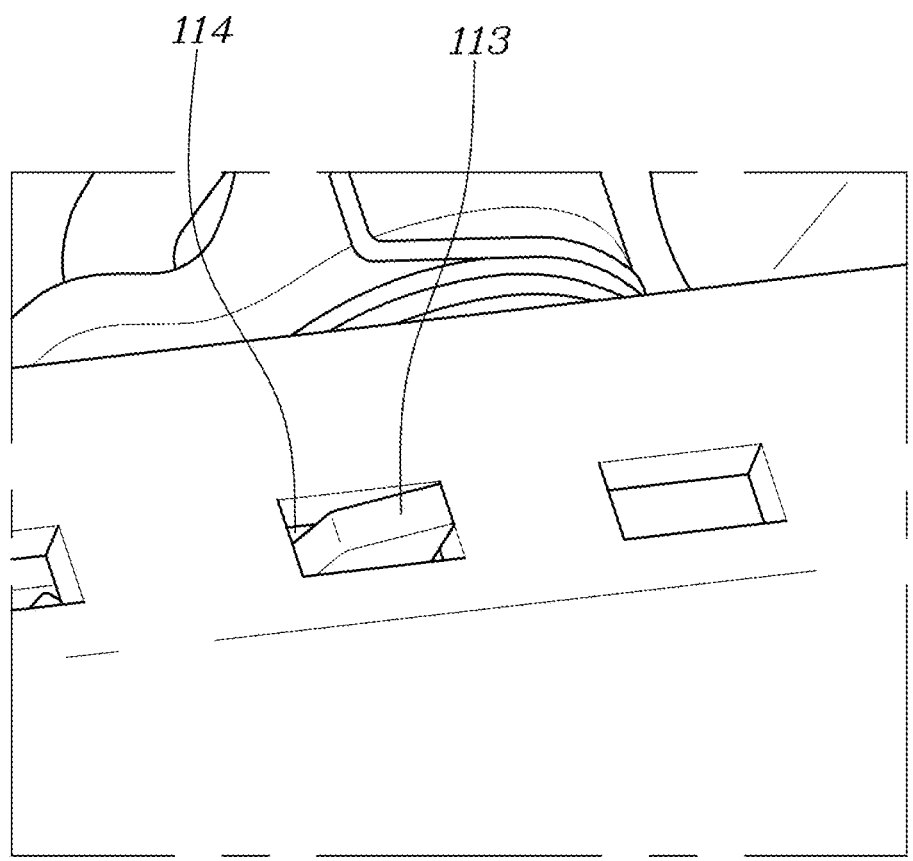
FIG. 7 is a view illustrating a state in which at least a portion of the fixing member connected to the carrier of the embodiment is coupled to the opening.

FIG. 7 is a view illustrating a state in which at least a portion of the fixing member connected to the carrier of the embodiment is coupled to the opening.

The fixing member (for example, the fixing member 112 of FIG. 6) may include a protrusion part 113. The fixing member may rotate together with the carrier on the basis of the rotation of the carrier (for example, the carrier 120 of FIG. 6). When the fixing member rotates, the protrusion part 113 included in the fixing member may be coupled to the opening part 114 formed in at least a portion of the housing (for example, the housing 140 of FIG. 2).

When the protrusion part 113 included in the fixing member is coupled to the opening part 114, a rotation and movement of the carrier and the fixing member may be stopped. In other words, when the protrusion part 113 included in the fixing member is coupled to the opening part 114, the rotation and movement of the fixing member are restricted, and thus the rotation and movement of the carrier connected to the fixing member may be suppressed together.

Figure 8:
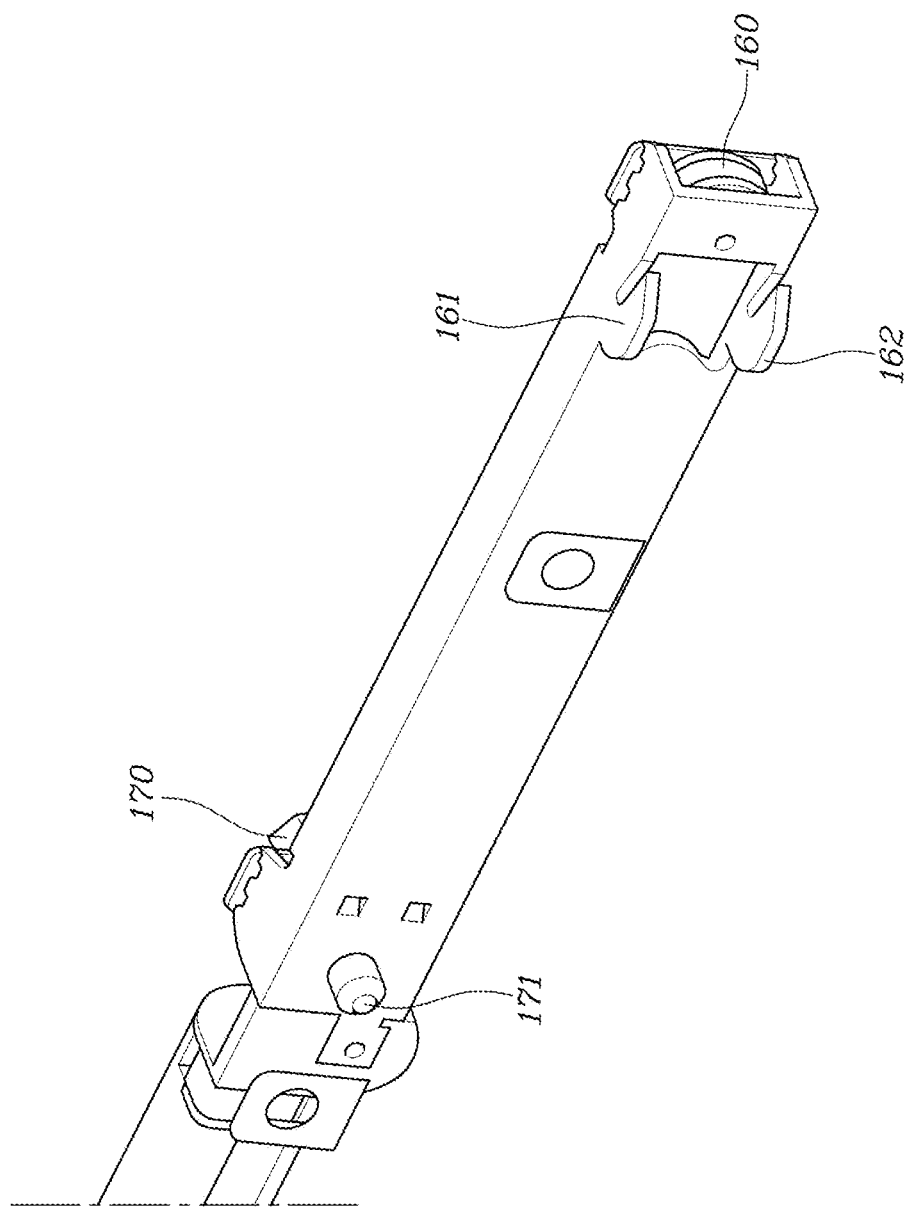
FIG. 8 is a view illustrating one side/surface of the pre-tensioner coupled to the seat of the embodiment.

FIG. 8 is a view illustrating one side/surface of the pre-tensioner coupled to the seat of the embodiment.

One surface of the pre-tensioner illustrated in FIG. 8 may be referred to as a surface (for example, second surface) facing in a direction opposite to the one surface (for example, first surface) illustrated in FIG. 2 described above.

The pre-tensioner (for example, the pre-tensioner 100 of FIG. 1) may be coupled to at least a portion of the seat (for example, the seat 200 of FIG. 1). For example, the pre-tensioner may be disposed inside the vehicle and coupled to a side of the seat frame configured to allow a passenger to sit. For coupling with the seat frame, the pre-tensioner may include various fastening members.

The pre-tensioner may include, for example, at least one coupling member disposed on the second surface of the housing. The at least one coupling member may include a first hook 161 and a second hook 162. In FIG. 8, the pre-tensioner is illustrated as including only two hooks 161 and 162 but is not limited thereto. The first hook 161 and the second hook 162 disposed on the second surface may be placed in one area on the second surface adjacent to the area (for example, the first zone) in which the first pulley 160 on the first surface is disposed.

The pre-tensioner may include, for another example, a bolt 171 disposed on the second surface of the housing. In FIG. 8, the pre-tensioner is illustrated as including only one bolt 171 but is not limited thereto. The bolt 171 disposed on the second surface may be placed in one area on the second surface adjacent to the area (for example, a second zone) in which the second pulley 170 on the first surface is disposed.

The seat may include a coupling portion configured to couple with the pre-tensioner. For example, the seat may include the seat frame in which a coupling part (for example, a nut) configured to be fastened with a bolt included in the pre-tensioner is provided. For another example, the seat may include the seat frame in which a coupling portion (for example, a hole) configured to be fastened with a coupling member (for example, a hook) included in the pre-tensioner is formed.

Figure 9:
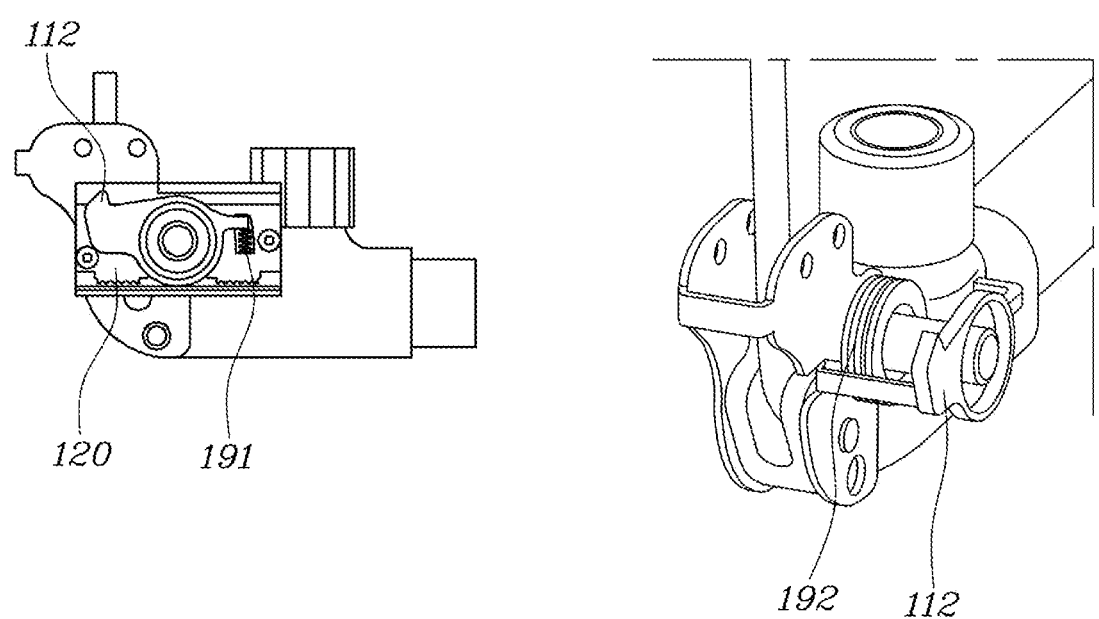
FIG. 9 is a view illustrating a fastening structure of the fixing member and the carrier of the embodiment.

FIG. 9 is a view illustrating a fastening structure of the fixing member and the carrier of the embodiment.

The fixing member 112 may be fastened to an external component (for example, the carrier 120) through various components. For example, the fixing member 112 may be coupled to the carrier 120 through a spring.

The fixing member 112 may be fastened to one area of the carrier 120 through, for example, a return spring 191. The return spring 191 is attached to one end of the fixing member 112 and one area of the carrier 120 and is contracted when an impact no less than a specified strength is applied thereto, and the one end of the fixing member 112 may move to be adjacent to the one area of the carrier 120 due to the contraction of the return spring 191.

The fixing member 112 may be fastened to one area of the carrier 120 through, for example, a torsion spring 192. The torsion spring 192 is contracted when an impact no less than a specified strength is applied thereto in a state of being wound on one shaft connected to the fixing member 112, and the fixing member 112 may be moved to be adjacent to the carrier 120 due to the contraction of the torsion spring 192.

Figure 10:
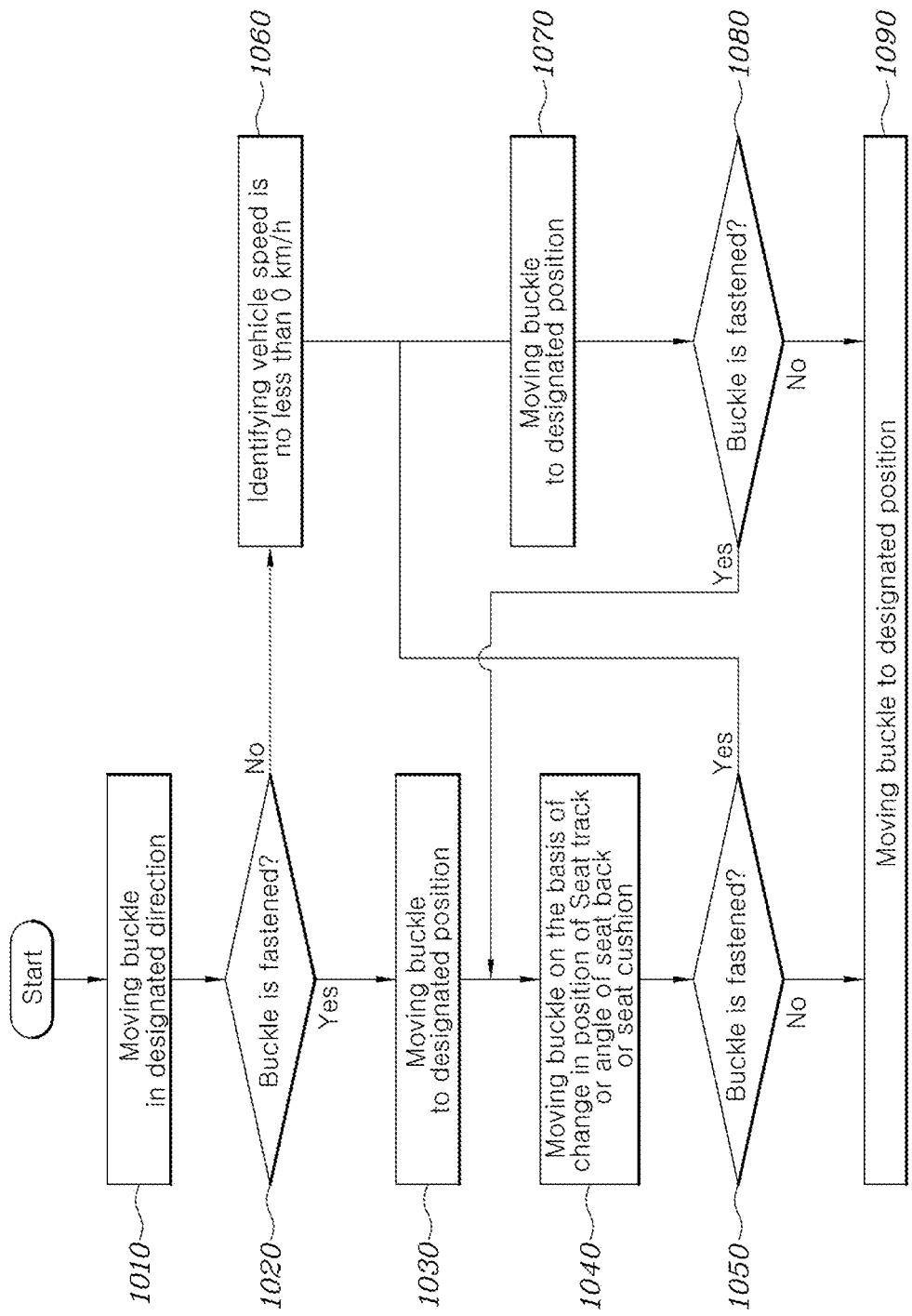
FIG. 10 is a flowchart illustrating a movement algorithm of a buckle fastened to the pre-tensioner of the embodiment.

FIG. 10 is a flowchart illustrating a movement algorithm of a buckle fastened to the pre-tensioner of the embodiment.

The pre-tensioner disclosed in FIG. 10 may be referred to as being coupled to the buckle.

In step 1010, the pre-tensioner may move the buckle in a designated direction. For example, when it is identified that a passenger is on board the vehicle, the pre-tensioner may move the buckle in a direction toward a front of the vehicle.

In step 1020, the pre-tensioner may identify whether the buckle is fastened. For example, the pre-tensioner may identify whether the buckle is fastened to the belt. For example, when it is identified that the buckle is fastened to the belt, the pre-tensioner may perform step 1030. For example, when it is identified that the buckle is not fastened to the belt, the pre-tensioner may perform step 1060.

In step 1030, the pre-tensioner may move the buckle to a designated position. For example, the designated position in step 1030 may be defined as a position at which the belt fastened to the buckle restrains a passenger's body as efficiently as possible. For example, the designated position may be a position shifted by the designated position in a direction toward a rear of the vehicle from the position of the buckle moved in step 1010.

In step 1040, the pre-tensioner may move the buckle on the basis of various changes of the adjacent components. For example, the pre-tensioner may move the buckle to a designated position on the basis of a change in a position of a seat track (or seat slide) to which the pre-tensioner is fastened and/or an angle of a seat back or seat cushion.

In step 1050, the pre-tensioner may identify whether the buckle is fastened. For example, when it is identified that the buckle is fastened to the belt, the pre-tensioner may perform step 1070. For example, when it is identified that the buckle is not fastened to the belt, the pre-tensioner may perform step 1090.

In step 1060, the pre-tensioner may determine whether to move the position of the buckle on the basis of a movement of the vehicle. For example, the pre-tensioner may identify that the vehicle speed is no less than 0 km/h.

In step 1070, the pre-tensioner may move the buckle to a designated position. For example, the designated position in step 1070 may be defined as a position at which the belt fastened to the buckle restrains the passenger's body as efficiently as possible.

In step 1080, the pre-tensioner may identify whether the buckle is fastened. For example, when it is identified that the buckle is fastened to the belt, the pre-tensioner may perform step 1040. For example, when it is identified that the buckle is not fastened to the belt, the pre-tensioner may perform step 1090.

In step 1090, the pre-tensioner may move the buckle to a designated position. For example, the designated position in step 1090 may be defined as a position that allows the passenger to conveniently fasten the belt to the buckle.

Figure 11:
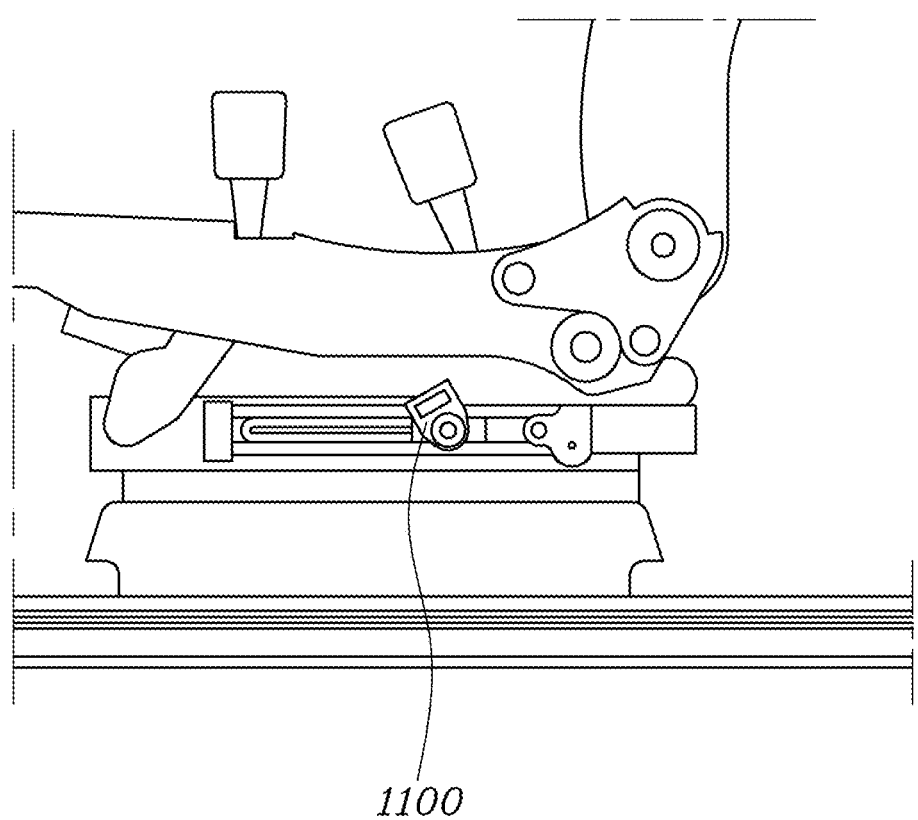
FIG. 11 is a view illustrating a pre-tensioner combined with a low anchor of the embodiment.

FIG. 11 is a view illustrating a pre-tensioner combined with a low anchor of the embodiment.

With reference to FIG. 11, the pre-tensioner of the embodiment may include a structure to which a low anchor 1100 is coupled.

For example, unlike the above-described embodiment of FIG. 2, the pre-tensioner may include a wire of a relatively short length or may have a structure in which the wire is omitted. For example, with reference to FIG. 11, the pre-tensioner may be coupled to the low anchor 1100. Since the pre-tensioner according to FIG. 11 occupies a relatively small mounting space, a layout of the vehicle interior space may be improved.

Figure 12:
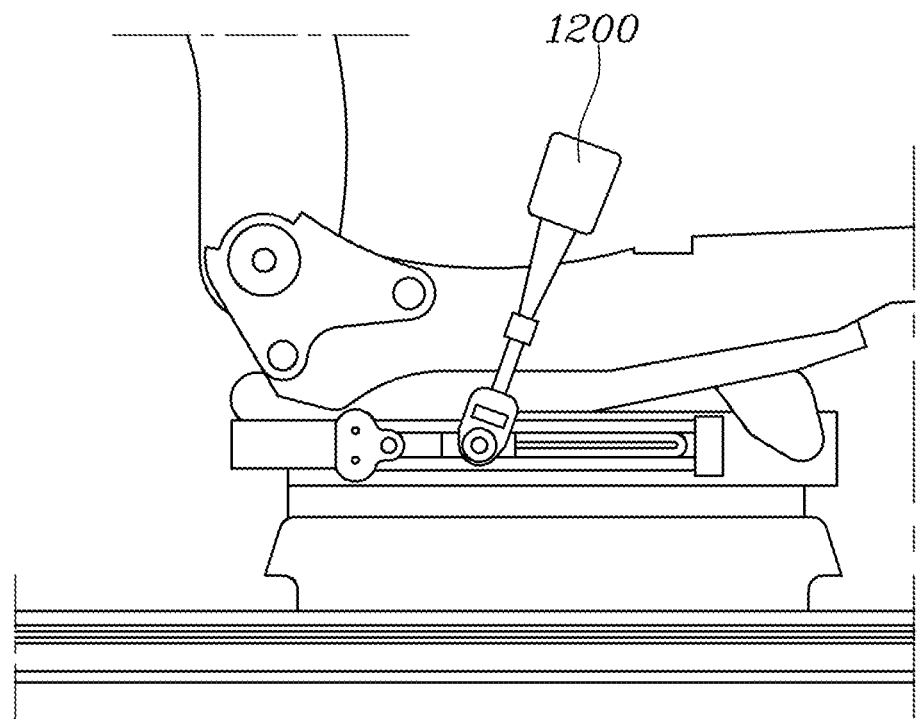
FIG. 12 is a view illustrating the pre-tensioner combined with a buckle of the embodiment.

FIG. 12 is a view illustrating the pre-tensioner combined with a buckle of the embodiment.

With reference to FIG. 12, the pre-tensioner of the embodiment may include a structure to which a buckle 1200 is coupled.

For example, unlike the above-described embodiment of FIG. 2, the pre-tensioner may be coupled to a component other than an anchor among components associated with the seat belt. For example, with reference to FIG. 12, the pre-tensioner may be coupled to the buckle 1200. The pre-tensioner according to FIG. 12 is not limitedly used for the anchor but may indicate to be able to be used with various components including the buckle 1200.

Those of ordinary skill in the art related to the present embodiments will understand that the present embodiments may be implemented in a modified form without departing from the essential characteristics of the above description. Therefore, the disclosed methods are to be considered in an illustrative rather than a restrictive sense. The scope of the present disclosure is indicated by the claims rather than the foregoing description, and all differences within the scope equivalent thereto should be construed as being included in the present disclosure.

What is claimed is:

1. A pre-tensioner for a seat belt, the pre-tensioner comprising:
    a housing;
    a wire coupled to the housing;
    an anchor or a buckle coupled to another end opposite to one end of the wire fastened to the housing;
    a carrier disposed on a first surface of the housing;
    a fixing member connected to the carrier;
    a first pulley disposed in a first zone of the first surface of the housing;
    a second pulley disposed in a second zone of the first surface opposite to the first zone with respect to the carrier;
    a driving unit having at least a portion coupled to the second pulley; and
    a belt disposed to mesh with the first pulley, the second pulley, and the carrier.

2. The pre-tensioner of claim 1, wherein the fixing member is configured to rotate in the same direction as a rotation direction of the carrier when the carrier rotates on the basis of an impact on the pre-tensioner.

3. The pre-tensioner of claim 1, wherein the fixing member further includes a protrusion part coupled to an opening part formed in at least a portion of the housing.

4. The pre-tensioner of claim 1, wherein the fixing member is connected to the carrier by using a torsion spring, a return spring, or a combination thereof.

5. The pre-tensioner of claim 1, further comprising:
    at least one coupling member disposed on a second surface of the housing facing a direction opposite to the first surface of the housing.

6. The pre-tensioner of claim 5, wherein the at least one coupling member is disposed in a zone adjacent to the first zone in which the first pulley is disposed.

7. The pre-tensioner of claim 1, further comprising:
    at least one hook disposed on a second surface of the housing facing a direction opposite to the first surface of the housing.

8. The pre-tensioner of claim 1, further comprising:
    at least one bolt disposed on a second surface of the housing facing a direction opposite to the first surface of the housing.

9. The pre-tensioner of claim 8, wherein the at least one bolt is disposed in a zone adjacent to the second zone in which the second pulley is disposed.

10. The pre-tensioner of claim 1, wherein the driving unit comprises a motor, a worm gear, a helical gear, a spur gear, or a combination thereof.

11. The pre-tensioner of claim 10, wherein the motor comprises a power unit.

12. The pre-tensioner of claim 1, wherein the belt is a timing belt.

13. The pre-tensioner of claim 1, wherein the belt is mounted inside the housing.

14. The pre-tensioner of claim 1, wherein the belt is moved or rotated by the driving unit.

15. The pre-tensioner of claim 1, wherein the belt is mounted on a rail.

16. The pretensioner of claim 1, wherein the belt is physically coupled to the carrier.

17. The pretensioner of claim 16, wherein the belt is physically coupled to an upper portion and a lower portion of the carrier.

18. A seat comprising a coupling part configured to couple with the pre-tensioner of claim 1.

19. A vehicle comprising the seat of claim 18.

20. A pre-tensioner for a seat belt, the pre-tensioner comprising:
    a housing;
    a carrier disposed on a first surface of the housing;
    at least one hook disposed on a second surface of the housing facing a direction opposite to the first surface of the housing;
    a fixing member connected to the carrier;
    a first pulley disposed in a first zone of the first surface of the housing;
    a second pulley disposed in a second zone of the first surface opposite to the first zone with respect to the carrier;
    a driving unit having at least a portion coupled to the second pulley; and
    a belt disposed to mesh with the first pulley, the second pulley, and the carrier.

* * * * *